UNITED STATES PATENT OFFICE.

FRANZ BECKER, OF PRAGUE, AUSTRIA-HUNGARY, ASSIGNOR TO BADISCHE ANILIN & SODA FABRIK, OF LUDWIGSHAFEN-ON-THE-RHINE, GERMANY, A CORPORATION.

PRODUCTION OF ALDEHYDE SULFOXYLATES.

No. 885,567.  Specification of Letters Patent.  Patented April 21, 1908.

Application filed February 6, 1906. Serial No. 299,783.

*To all whom it may concern:*

Be it known that I, FRANZ BECKER, doctor of philosophy and chemist, subject of the Emperor of Austria-Hungary, residing at Prague, in Austria-Hungary, have invented new and useful Improvements in the Production of Aldehyde Sulfoxylates, of which the following is a specification.

My invention relates to the production of aldehyde sulfoxylates.

A method is described in the *Berichte der Deutschen Chemischen Gesellschaft* Vol. 38, p. 1072, for the preparation of formaldehyde sulfoxylates by reducing formaldehyde bisulfite with zinc dust and acetic acid (see also Letters Patent No. 793,610). I have now discovered that aldehyde sulfoxylates can be obtained easily and in good yield without it being necessary to have present during the reaction either any extraneous acid, or any alkali.

According to this invention I allow formaldehyde, zinc dust and a bisulfite to react upon one another at a temperature raised above forty degrees centigrade and, of course, instead of any of the above named ingredients an equivalent can be employed, for instance instead of formaldehyde, acetaldehyde can be employed, and instead of zinc use may be made of any other metal, such for instance as iron, which has a similar reducing action. Instead of a bisulfite, a hydrosulfite can be employed and since, as is well known, aldehyde hydrosulfites behave chemically as if they were composed of equimolecular proportions of aldehyde bisulfite and aldehyde sulfoxylate, the hydrosulfites are fully equivalent to the bisulfites for the purposes of this invention.

In order to work up the products of the reaction, the mixture can, when sodium bisulfite is employed, be filtered in order to remove zinc and zinc hydroxid and the filtrate can be evaporated. When zinc bisulfite is the compound to be reduced, the reaction mixture should preferably be treated finally with, for instance, a sodium salt and then be filtered and evaporated.

The following examples will serve to further illustrate the nature of my invention and how it can be carried into practical effect, but my invention is not confined to these examples. The parts are by weight.

Example 1. Mix together one hundred (100) parts of a forty (40) per cent. sodium bisulfite solution, eighteen (18) parts of a forty (40) per cent. formaldehyde solution and thirty-five (35) parts of zinc dust, and boil the whole for two (2) hours. Filter off the zinc mud and evaporate the filtrate, preferably *in vacuo*. In this way a white porcelain-like mass is obtained which is free from zinc, is not hygroscopic, and is stable in the air. The reaction that occurs can be represented by the following equation:

$$NaHSO_3 + CH_2O + Zn + H_2O = NaHSO_2 \cdot CH_2O + Zn(OH)_2$$

Example 2. Boil together, for from two (2) to three (3) hours, one hundred and eight (108) parts of a twenty-two (22) per cent. zinc bisulfite solution, fifteen (15) parts of a forty (40) per cent. formaldehyde solution in four hundred (400) parts of water, and twenty-four (24) parts of zinc dust, and add sodium carbonate, or sodium sulfid, to the paste formed, until all the zinc is precipitated. Filter off this precipitated zinc and evaporate the filtrate *in vacuo*. The reaction which occurs during the reaction can be represented by the following equation:

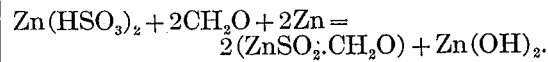

$$Zn(HSO_3)_2 + 2CH_2O + 2Zn = 2(ZnSO_2 \cdot CH_2O) + Zn(OH)_2.$$

Subsequently on the addition of a sodium salt the double decomposition of the zinc salt to the sodium salt takes place.

Example 3. Boil together, for one (1) hour, fifty (50) parts of a forty-two (42) per cent. sodium bisulfite solution, twenty (20) parts of a thirty (30) per cent. formaldehyde solution and twenty-three (23) parts of very finely divided iron powder containing about sixty (60) per cent. of free metallic iron. Filter off and wash the residue, whereupon a solution of sodium formaldehyde sulfoxylate which is almost free from iron is obtained and this can be evaporated *in vacuo*. The reaction that occurs can be represented by the following equation:

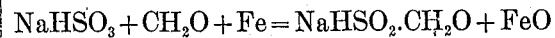

$$NaHSO_3 + CH_2O + Fe = NaHSO_2 \cdot CH_2O + FeO$$

Now what I claim is:

1. The process of producing aldehyde sulfoxylate by acting at a temperature above 40° C on a bisulfite with an aldehyde and with a metal which has a reducing action, while totally avoiding the presence of extraneous acid.

2. The process of producing formaldehyde sulfoxylate by acting at a temperature above 40° C. on a bisulfite with formaldehyde and with a metal which has a reducing action, while totally avoiding the presence of extraneous acid.

3. The process of producing formaldehyde sulfoxylate by acting at a temperature above 40° C. on a bisulfite with formaldehyde and with zinc dust, while totally avoiding the presence of extraneous acid.

In testimony whereof I have hereunto set my hand in the presence of two subscribing witnesses.

FRANZ BECKER.

Witnesses:
ARTHUR SCHWEINBURG,
ARTHUR SCHWERZ.